Figure 1:
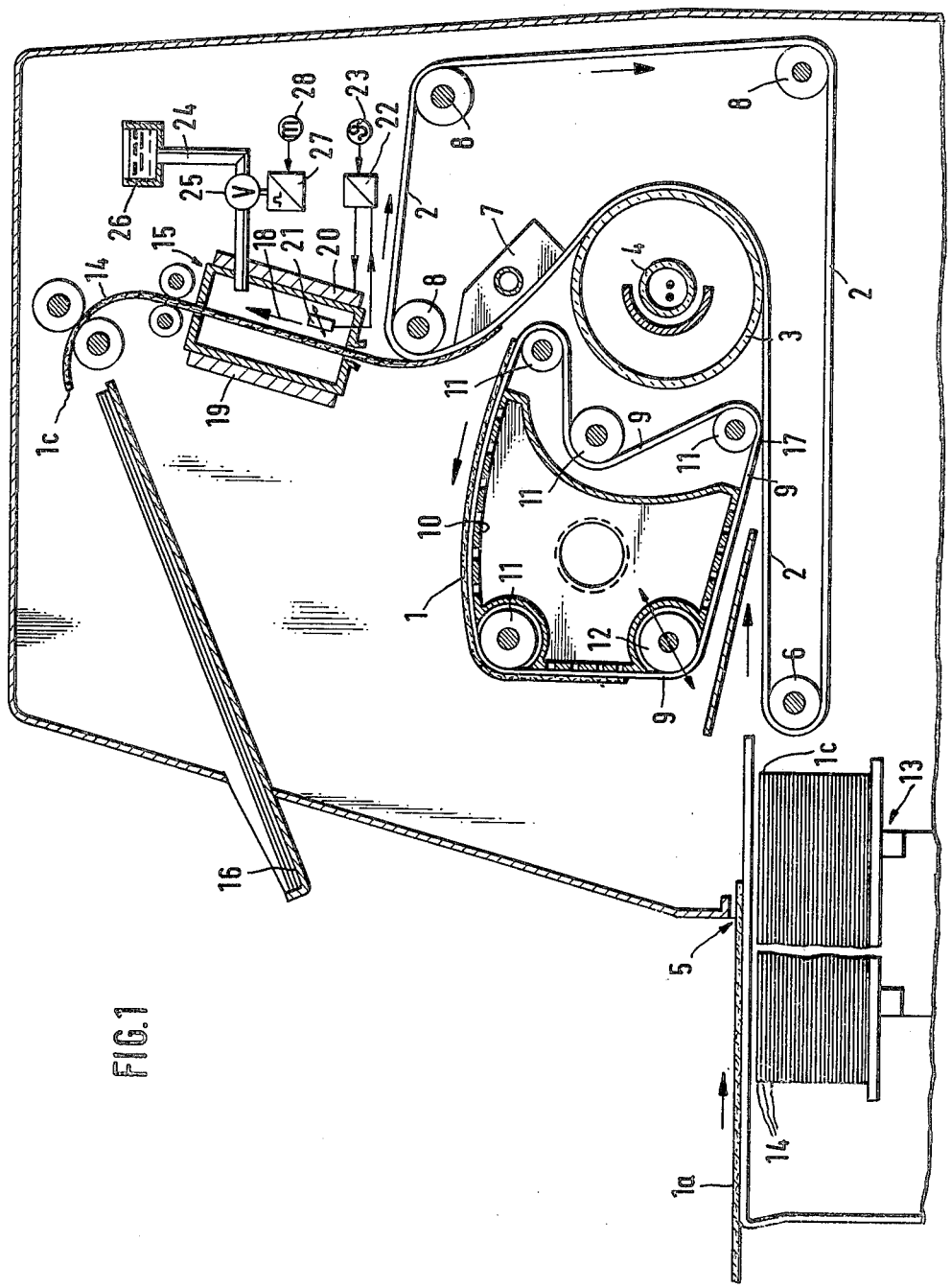

United States Patent [19]

Schröter et al.

[11] 4,135,814
[45] Jan. 23, 1979

[54] PROCESS AND APPARATUS FOR THE PRODUCTION OF PHOTOCOPIES USING TWO-COMPONENT DIAZOTYPE MATERIAL

[75] Inventors: Herbert Schröter, Taunusstein; Eckehard Stein, Frankfurt, both of Fed. Rep. of Germany

[73] Assignee: Hoechst Aktiengesellschaft, Fed. Rep. of Germany

[21] Appl. No.: 800,876

[22] Filed: May 26, 1977

[30] Foreign Application Priority Data

May 28, 1976 [DE] Fed. Rep. of Germany ....... 2623982

[51] Int. Cl.² .................... G03C 1/58; G03B 27/30
[52] U.S. Cl. .................................. 355/106; 96/49
[58] Field of Search .............. 355/107, 108, 110, 111, 355/132, 77, 100, 105, 106, 27, 28; 96/49

[56] References Cited

U.S. PATENT DOCUMENTS

| | | | |
|---|---|---|---|
| 2,761,364 | 9/1956 | Cross | 96/49 X |
| 3,160,085 | 12/1964 | Mastroianni | 355/106 |
| 3,380,365 | 4/1968 | Umahashi | 355/106 |
| 3,397,630 | 8/1968 | Pratt | 355/106 |
| 3,411,906 | 11/1968 | Boone et al. | 96/49 |
| 3,421,895 | 1/1969 | Haining et al. | 96/49 |
| 3,589,810 | 6/1971 | Umahashi | 355/106 X |
| 3,710,708 | 1/1973 | Schuman et al. | 355/106 X |
| 3,715,213 | 2/1973 | Nihyakumen et al. | 96/49 |

*Primary Examiner*—Donald A. Griffin
*Attorney, Agent, or Firm*—James E. Bryan

[57] ABSTRACT

This invention relates to an improvement in the process for the production of photocopies with two-component diazotype material which cannot be developed by the action of heat alone and which, during continuous passage through a photocopying machine, is first exposed imagewise to light emitted by a mercury lamp and is then exposed, for the purpose of development, to an ammonia/water mixture, in vapor form, in a development chamber, the improvement comprising employing light emitted from a gallium-modified or indium-modified mercury lamp for the imagewise exposure of the diazotype material, and exposing the diazotype material, which has been exposed to light, to an ammonia/water vapor mixture in the development chamber, said mixture in terms of vapor pressure being unsaturated and containing at most 25 per cent by weight of ammonia, at a temperature of about 105 to 120° C and at a predetermined pressure. The invention also relates to an apparatus for performing the process.

6 Claims, 5 Drawing Figures

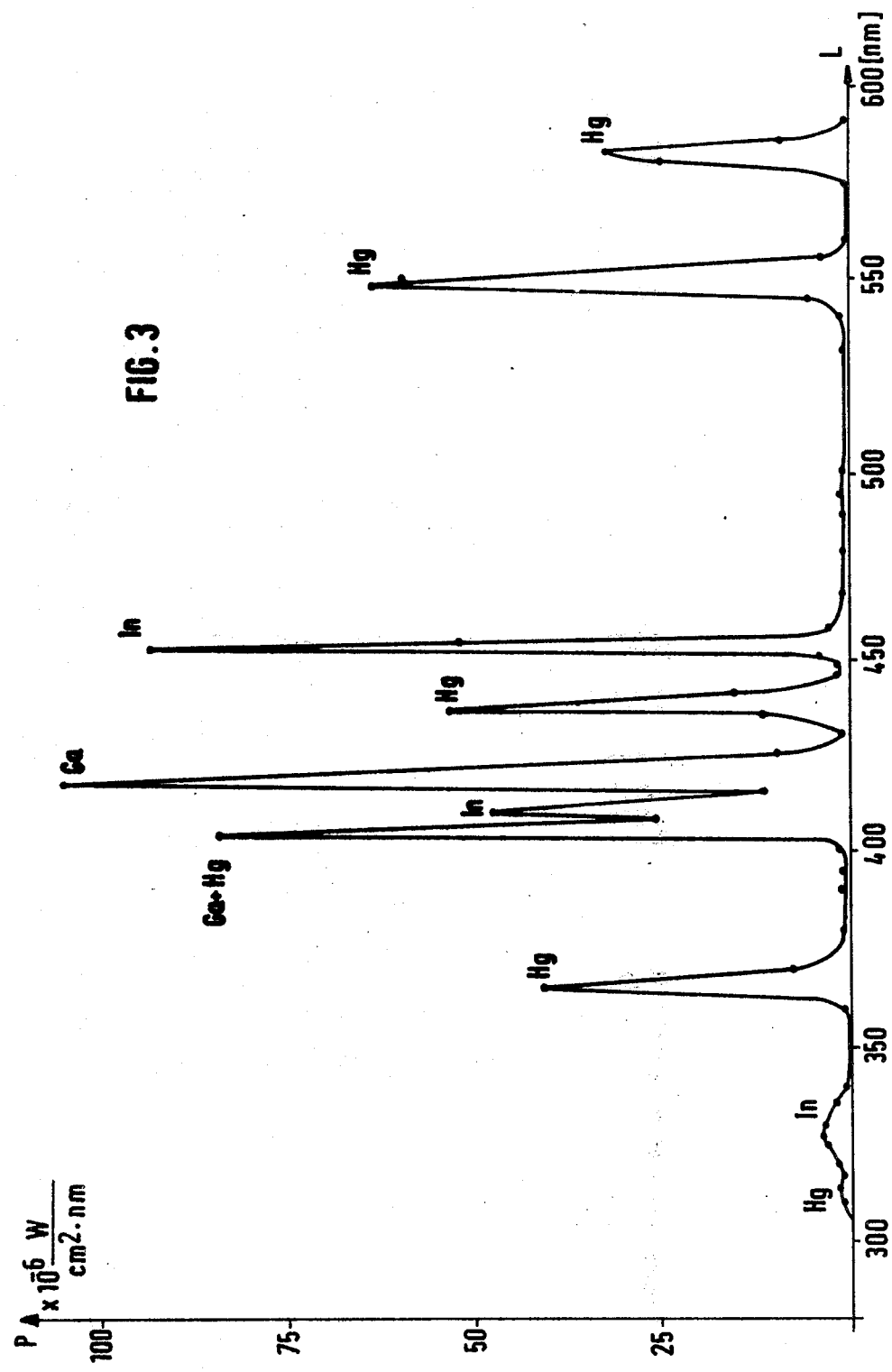

PROCESS AND APPARATUS FOR THE PRODUCTION OF PHOTOCOPIES USING TWO-COMPONENT DIAZOTYPE MATERIAL

The invention relates to a process for the production of photocopies using two-component diazotype material. The invention further relates to an apparatus for carrying out this process.

To produce photocopies based on two-component diazotype material, this material is first exposed imagewise. Thereby, the diazo compound contained in the material for positive copies is converted in the non-image areas, by the action of light in the blue and near-ultraviolet spectral region, into colorless compounds which do not combine with other compounds in the material to form a dyestuff. On the other hand, the diazo compound which, in the image areas, has not been converted by the action of light, forms, upon development, an azo dyestuff with a color coupling component. In carrying out these sequences in practice, it is necessary to balance the time of the imagewise exposure and of the subsequent development so that the diazotype material can be transported at the same speed through an exposure zone and through a subsequent development zone. Accordingly, improving the working speed in one zone demands a corresponding change in the other zone. These changes, for various reasons, cannot be achieved directly, and to any desired degree, by simple dimensional variations. Thus, if the productivity of the development zone is increased, matching the preceding actinic exposure of the diazotype material thereto can present a problem. If it proves possible to halve the duration of development, the exposure time also would have to be shortened by half. When using the hitherto customary lamps it then would be necessary, for example, to employ, in place of one lamp with an output of 5 kW, two such lamps with a total output of 10 kW. This would, however, in many cases undesirably increase the connection rating of the photocopying machine. Apart from this, additional problems may arise in connection with cooling these lamps. It is therefore desirable not to alter the connection rating of the machine and also as far as possible to leave the construction of the exposure station unchanged.

According to the prior art it is, in this context, known specifically to provide high pressure mercury vapor lamps in order to generate high energy light with a high proportion in the ultraviolet region (Kosar "Light-Sensitive Systems, 1955, New York, London, Sydney, pages 197-199"). According to this publication, the emission of these lamps is restricted to the very narrow bands of the mercury lines, which exhibit peak values at 313, 334, 366, 404, 435, 546, and 577 nm (nanometers). Of these, the bands at 366 and 404 nm are the most important for the customary diazotype materials. In the case of the development of papers which are sensitized with the so-called superfast diazo compounds and whose photosensitivity is shifted more towards the visible blue part of the spectrum, the radiation emitted by the mercury lamp at 435 nm also contributes to the exposure. The last-mentioned materials also can be exposed using filament lamps or fluorescent lamps, which emit a small proportion of ultraviolet light in the violet and blue spectral region.

On the other hand, it would also, however, present a problem, if an exposure station of the desired productivity were available, to match a suitable development zone (development chamber) thereto. To increase the development productivity, it would seem obvious to lengthen the development zone or to increase the size of the development chamber in the transport direction of the diazotype material. This may make it necessary to have additional guide members in the development chamber. The paper remains longer in a moist atmosphere, thereby becoming mechanically more sensitive. Apart from the larger constructional bulk, problems can also arise, for example, in such cases due to the fact that condensations should be avoided in the development chamber; attempts are made to achieve this by additional heating of the coolest parts of the development chamber, at which condensate would otherwise precipitate.

The prior art also provides a photographic developing machine with a vaporizer which is heated by a heating device to a temperature above 100° C., especially to 105° C. The vaporizer is connected to a development chamber via a pipeline into which a condenser is inserted and through which vapor can pass. A heating device is also provided in the development chamber and heats the latter to a temperature above 100° C., especially to 115° C. The rate at which the developer solution runs in, and the temperature in the vaporizer chamber, are regulated so as to achieve uniform and substantially complete vaporization of the aqueous ammonia introduced. When the ammonia-water vapor mixture rises to the development chamber through the connecting pipeline, a part of this mixture is condensed in the condenser, which is maintained at a temperature of below 100° C. The composition of the developer vapor is determined by the lowest temperature in the vaporizer/development chamber system, including the interposed condenser. Because the temperature at which the developer vapor leaves the condenser is, in particular, 69° C., the concentration ratio in the developer vapor in the development chamber is 83 percent by weight of ammonia to 17 percent by weight of water. Under these conditions, it is certain that condensation does not take place, even temporarily, in the development chamber and on its guide members; such condensation could lead to damage of the diazotype material transported through the development chamber. Thus, according to this prior art, relatively rapid development is indeed achieved, but problems of environmental pollution arise, both due to the residual water obtained from the condenser and due to the relatively high concentration of ammonia in the developer vapor in the development chamber, so that the waste air must be expected to contain a relatively high amount of ammonia (Canadian Pat. No. 537,464).

Accordingly, the sequences of exposure and development of diazotype material which runs at uniform speed through the various stations of a photocopying machine cannot be directly optimized independently of one another.

The present invention provides an optimum combination of exposure and subsequent development of two-component diazotype material which cannot be developed by the mere action of heat. This development process should be distinguished by very economical operation, which makes it appear desirable, inter alia, to keep the developer consumption, in particular the consumption of ammonia, and the consumption of electrical energy, at a low value, or to reduce them. Nevertheless, the photocopies obtained by this process should be distinguished by good quality, which demands, inter alia, that no blotches should form as a result of aqueous ammonia which precipitates in particular in the region of the transport and guide members for the diazotype material. Furthermore, the process is intended, as far as possible, to avoid pollution of the environment, especially by residual water containing ammonia.

In the invention, use is made, inter alia, of essential features of an earlier proposal (German Patent Application No. P 25 34 352.6-51), wherein an aqueous ammonia vapor mixture which in terms of vapor pressure is unsaturated and contains at most 25 percent by weight of ammonia, is heated in the development chamber to a temperature of between about 105° and 120° C. under a predetermined pressure, preferably atmospheric pressure, and ammonia and/or water are introduced, in a manner appropriate to maintaining this condition. This in itself, however, does not yet completely solve the total problem described above.

When using the process of the invention, not only is the development time reduced to about half when starting from a given dimension (length) of the development zone, but the exposure time is also reduced by about the same factor, while the connection rating of the lamp remains the same. This is attributable to the fact that the gallium-modified and/or indium-modified lamp emits, in contrast to conventional mercury lamps, a substantial proportion of its total light output additionally in the spectral region between about 400 and 460 nm, in which customary two-component diazotype materials are sensitive.

The two-component diazotype material exposed in this way is developed correspondingly rapidly by exposing it to a developer gas atmosphere comprising an ammonia/water vapor mixture which is unsaturated in terms of vapor pressure, is heated to a temperature between about 105° and 120° C., and contains at most 25 percent by weight of ammonia. The rapid development of the exposed diazotype material which enters the development chamber containing this developer gas atmosphere, and which on entry is relatively cool, namely at about 35° C., can be explained by the fact that because of the high proportion of water vapor, namely greater than or equal to 75 percent by weight, in the developer gas, a very thin condensate film of aqueous ammonia ($NH_4OH$) forms momentarily on the surface of the relatively cool diazotype material. This condensate film there leads to a more rapid neutralization of the acid components in the diazo layer, which prevent the coupling reaction, and hence leads to an increase in the speed of the coupling reaction. Nevertheless, the diazotype material does not undesirably carry significant amounts of ammonia out of the development chamber, because, as it continues to travel through the development chamber, the diazotype material is evidently heated up so rapidly that the thin film of condensate again evaporates. Apart from this, only little ammonia is lost with the waste air because the developer gas contains only a low concentration of ammonia. This results in the further advantage of little pollution of the environment. It is also advantageous, from the point of view of pollution of the environment, that during the vaporization of the aqueous ammonia and the subsequent development with the ammonia gas, at the stated temperatures, no residual water is formed. It is noteworthy that, in spite of the diazotype material being developed at the stated high temperatures, no undesirable discolorations occur.

In the development chamber, at any instant of the introduction of the developer, the desired reaction parameters of temperature, material concentrations and pressure prevail, so that on the one hand the diazotype material is very thoroughly fully developed and on the other hand pollution of the environment is reduced.

Overall, therefore, the steps of exposure and development of the diazotype material, which in order to produce the finished photocopy are necessarily carried out successively, are matched in a particularly advantageous manner, because both process steps make it possible, for a comparable design of the photocopying machine, to reduce the exposure time and the development time each by a factor of about 0.5 compared to the conventional technique, and thus approximately to double the throughput speed. Any remaining slight difference between the factor by which the exposure time is reduced and the factor by which the development time is reduced can now be, without problems, balanced out in designing the construction of the photocopying machine.

A variant of the photocopying machine for carrying out the process according to the invention, is based on the known arrangement with a vaporizer which is spatially separate from the development chamber but is connected thereto in such a way as to permit the passage of vapor, the temperature in the development chamber and in the vaporizer being maintained at values above 100° C. However, the combination according to the invention exhibits the peculiarity, in respect of the development apparatus, that the connecting pipeline between the vaporizer and the development chamber is, from a thermal point of view, of such construction that the temperature in this pipeline at no point falls below 100° C. In combination with the process according to the invention, which provides the use of an aqueous ammonia solution containing at most 25 percent by weight of ammonia, the ammonia concentration of the atmosphere present in the development chamber is thus here again at most 25 percent by weight. This achieves rapid development, matching the rate of exposure, coupled with little pollution of the environment.

Figure 2:
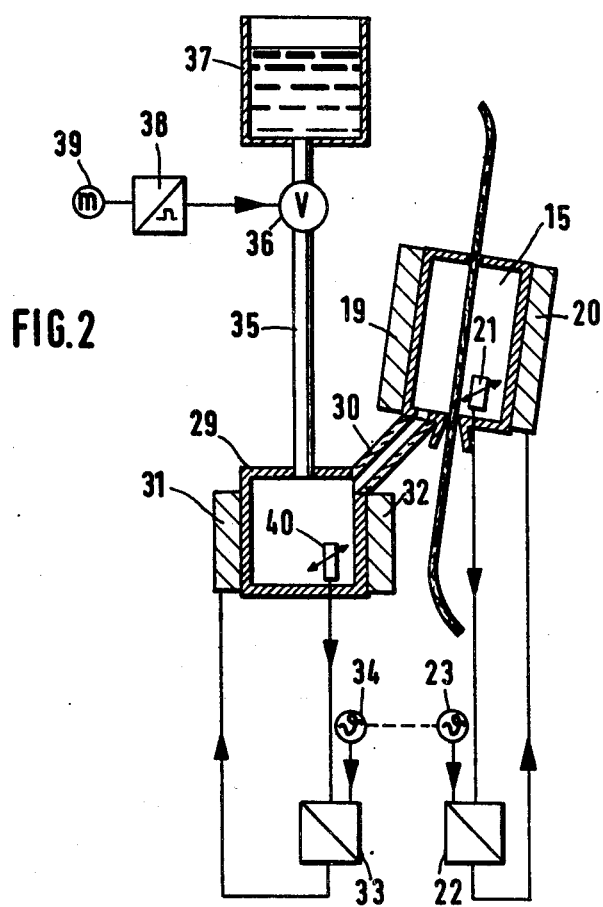
Figure 4A:
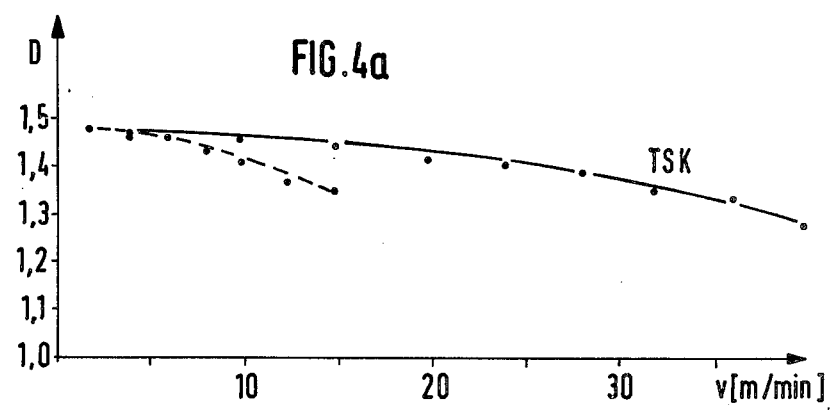
Figure 4B:
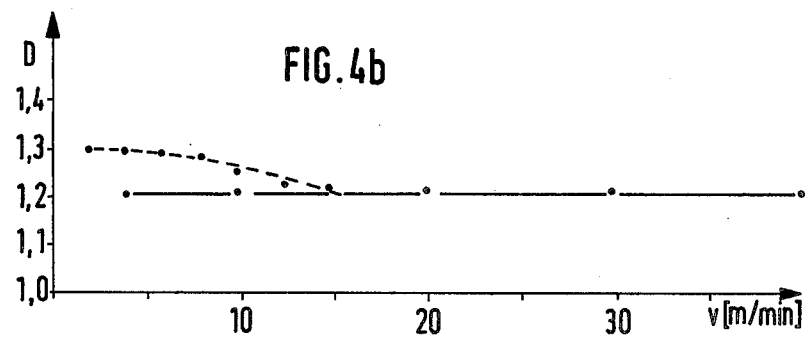

The invention will be further illustrated with reference to the accompanying drawings in which:

FIG. 1 shows a schematic representation of a photocopying machine in cross-section, in which is shown, in particular, the path of the copying material (diazotype material) in the region of the exposure station and through the exposure chamber, FIG. 2 shows a variant of the vaporizer/development chamber system of the photocopying machine according to FIG. 1, FIG. 3 shows the light output of the lamp used in accordance with the invention, as a function of the wavelength and FIGS. 4a and 4b each show a graphical representation of the optical densities of various developed copying materials as a function of their rate of transport through the development chamber.

FIG. 1 shows a photocopying machine which is designed for repeat copying operation. In such a machine, the advantages achieved by rapid exposure and development manifest themselves particularly advantageously.

In FIG. 1, part of the path over which a copying original 1 is transported is formed by a section of a conveyor belt 2 which adapts to the shape of a part of a main cylinder 3. A gallium-modified and/or indium-modified mercury lamp 4 is located in the main cylinder. The path of the conveyor belt 2 leads from an infeed point 5 for the copying original, where a drive roller 6 for the conveyor belt 2 is provided, via the main cylinder, past a separating device 7 and along an arrangement of idling rollers 8 back to the infeed point 5.

A further section of the path of the copying original is formed by the second conveyor belt 9. The path of this section results from the shape of a suction box 10 located within the second conveyor belt, and from the arrangement of rollers 11 and 12.

In addition, a sheet feeder 13 for sheets 14 of copying material is provided inside the photocopying machine shown in FIG. 1; a two-component diazotype material is used for these sheets. A mechanism, not shown in the drawing, serves to take copying material from the stack either in order to bring it into register with a first copying original 1a at the infeed point 5 or to bring it into register with a copying original 1, which is being returned from the main cylinder 3, at a meeting point.

In every case, a sheet of copying material 14 which is in register with the copying original 1, 1a is passed along the main cylinder 3 and thereby exposed to the light emitted by the lamp and passing through the copying original. At the separating device 7, the exposed sheet of copying material 14 is separated from the copying original 1, 1a and transported through a development chamber 15 to an output point 16. The copying original separated off at the separating device 7, on the other hand, travels with the second conveyor belt 9 over the suction box 10 as far as the point 17 where it is supplied with a new sheet of copying material 14. The copying original 1 runs along the closed circuit until the desired number of copies has been produced from this copying original.

The copying material, in this case a sheet 1c, is transported through the development chamber 15 in the direction of the arrow 18. On the walls of the development chamber, surface heaters 19 and 20 are provided, which cover virtually the entire surface, so that only slight temperature differences arise in the development chamber. In the development chamber, a thermocouple 21 is provided, which is connected, as the means of recording the actual value, to a temperature regulator 22. The desired temperature is set on the desired-value setting device 23, in particular to a value above 105° C. but at most 120° C. For this purpose, the output of the temperature regulator is connected to the surface heaters.

A liquid mixture of ammonia and water, containing 25 percent by weight of ammonia, is fed through a feed pipeline 24 into the development chamber. For this purpose, the feed pipeline is connected via a valve 25 to a stock vessel 26 for the ammonia/water mixture. Pulsewise actuation is effected by means of a control instrument 27, which is set, by means of a manually regulated setting element, to the amount of liquid to be squirted, as replenishment, into the development chamber per unit of time.

While in FIG. 1 the ammonia/water vapor mixture is generated directly in the development chamber, a vaporizer 29 separate from the development chamber 15 is provided, according to the variant shown in FIG. 2, for forming the ammonia/water vapor mixture. The vaporizer 29 is connected to the interior of the development chamber via a thermally insulated pipeline 30. The vaporizer, similarly to the development chamber, has the surface heaters 31 and 32, which are fed from a second temperature regulator 33. To set the temperature in the interior of the vaporizer, which again should have a value of between 105° C. and 120° C., a second desired-value setting device 34 is connected to an input of the second temperature regulator. The desired-value setting devices 23 and 34 are coupled to one another in order to set up proportionate or identical temperatures in the development chamber and in the vaporizer. A feed pipeline 35, which is connected via a valve 36 to a stock vessel 37 for the aqueous ammonia solution, leads to the vaporizer. The aqueous ammonia solution here again contains 25 percent by weight of ammonia. The valve 36 is again actuated by means of a control instrument 38 which can be set by means of a setting element 39. A second thermocouple 40 is also shown in the vaporizer.

As the gallium-modified and indium-modified mercury lamp 4 employed in the exposure station it is possible to use, for example, a PQ 5024 Z1 No. 4 lamp from Messrs. Quarzlampengesellschaft, Hanau. The proportions of the output $P$, of the light emitted by this lamp are shown as a function of the wavelength $L$ in FIG. 3. The curve shown in FIG. 3 was determined in the center of the lamp, at a power consumption of 3 kW. Instead of the PQ 5024 Z1 No. 4 lamp it is also possible to successfully employ other gallium-modified and indium-modified mercury lamps, for example lamp No. 658 from Messrs. Gleissner.

FIG. 3 in particular shows the emission lines of gallium at 418 nm and indium at 410 nm, which substantially contribute to the rapid exposure of the copying material. Experiments have shown that when using such a lamp the exposure time of a "TSK"-type paper from Messrs. Kalle, a division of Hoechst AG, is reduced by 50% or more compared to the exposure time required with a pure mercury lamp. When using the "Ultra Rot"-type paper of the same company, the exposure time is lowered to about 40% compared to the exposure time required with a pure mercury lamp.

As is shown in FIGS. 4a and 4b, using the process according to the invention the development time is also reduced, compared to the process hitherto customary in practice, in about the same ratio if the length of the development zone is maintained the same. FIGS. 4a and 4b show the density values achieved when developing unexposed copying materials, if the copying material runs through a development chamber at different transport speeds $V$. The solid line shows the values achievable in accordance with the present invention, while the broken line, in contrast, shows the values which are achieved with a conventional photocopying machine (Ozaprimus of Messrs. Kalle, a division of Hoechst AG). In order to carry out the process according to the invention, a small developer was built, which permits the continuous development of papers up to size DIN A 4. The volume of the development chamber is about 1,200 cm$^3$ and the length of the development zone about 18 cm. A temperature of 110° C. was set in the development chamber. About 150 cm$^3$ of aqueous ammonia solution, containing 25 percent by weight of ammonia, were fed per hour into this chamber. After full-tone complete development of the unexposed papers, these were immediately post-exposed in order to destroy any unreacted residual diazo material which might be present. Thereafter, the density values $D$ were measured.

The development with a conventional photocopying machine (Ozaprimus), carried out as a parallel experiment, took place at a mean temperature of 65° C. in the development chamber. An amount of 450–500 cm$^3$ of aqueous ammonia solution at a concentration of 25 percent by weight of ammonia was fed in per hour to ensure that excess ammonia vapor was available for the development reaction. The samples obtained were again post-exposed before measuring their density.

In order to make the results of the measurements, on the one hand after development according to the invention, and, on the other hand, after conventional development, comparable, the results obtained for the new process were converted by calculation to relate to a length of development zone corresponding to that of the conventional photocopying machines.

Proceeding in this way, it was found that the new process offers substantial advantages over the previous process also because, using the new process, the decrease in density with speed is less than when using the conventional process. Furthermore, using the new process, any desired density value is achieved at approximately twice the speed of travel of the copying material through the development chamber. In the case of developing the "Ultra Rot" type of paper, what is in particular conspicuous, according to FIG. 4b, is that the density of the developed copying material is substantially independent of the transport speed.

Overall, it is thus possible, using the invention, approximately to double the copying output with a photocopying machine which has the same dimensions and substantially identical parts as a conventional photocopying machine and has the same power consumption of the exposure station. On the other hand it is possible, upon reducing the power consumption of the modified mercury lamp and on fitting a shorter development chamber, to achieve the same copying output as with a conventional modern automatic copier.

It will be obvious to those skilled in the art that many modifications may be made within the scope of the present invention without departing from the spirit thereof, and the invention includes all such modifications.

What is claimed is:

1. In the process for the production of photocopies with two-component diazotype material which cannot be developed by the action of heat alone and which, during continuous passage through a photocopying machine, is first exposed imagewise to light emitted by a mercury lamp and is then exposed, for the purpose of development, to an ammonia/water mixture, in vapor form, in a development chamber,
   the improvement comprising employing light emitted from a gallium-modified and/or indium-modified mercury lamp for the imagewise exposure of the diazotype material,
   and exposing the diazotype material, which has been exposed to light, to an ammonia/water vapor mixture in the development chamber, said mixture in terms of vapor pressure being unsaturated and containing at most 25 percent by weight of ammonia, at a temperature of about 105° to 120° C. and at a predetermined pressure.

2. A process according to claim 1 in which the pressure is atmospheric pressure.

3. A process according to claim 1 including feeding only sufficient aqueous ammonia solution per unit time into said development chamber, that the amount of heat of conversion required for complete vaporization of the introduced ammonia solution, at a temperature above the boiling point of water, is less than the amount of heat which can be supplied to the ammonia solution in the same interval of time, said heat being supplied in a manner such that the temperature does not fall below the boiling point of water at any element with which the developer gas thus produced comes into contact.

4. A process according to claim 3 in which the aqueous ammonia solution is fed into a vaporizer and then into said development chamber.

5. In a photocopying apparatus for the production of photocopies with two-component diazotype material which cannot be developed by the action of heat alone and including an exposure station and a development chamber, the latter following the former in the direction of transport of the diazotype material,
   and further including a heating device and a feed pipe, opening into said development chamber, for feeding aqueous ammonia solution into said chamber,
   the improvement comprising a gallium-modified and/or indium-modified mercury lamp in said exposure station,
   and heating means for heating the development chamber to a temperature between about 105° and 120° C., said development chamber having a sufficiently high heat capacity that a first partial amount of aqueous ammonia solution fed into the chamber in one time interval is completely vaporized, and superheated, before a second partial amount is fed into the chamber in a succeeding time interval.

6. An apparatus according to claim 5 including vaporizer means connected to the development chamber,
   feed pipe means opening into the vaporizer means,
   vaporizer heating means whereby it can be heated to a temperature above 100° C., the heat capacity of the vaporizer and the amount of aqueous ammonia solution fed to the vaporizer per unit of time being such that the total amount of solution fed in is vaporized continuously,
   and pipe means connecting said vaporizer means and said development chamber and being so constructed that the temperature therein at no point is below 100° C.

* * * * *